(12) United States Patent
Yamanaka et al.

(10) Patent No.: US 9,695,922 B2
(45) Date of Patent: Jul. 4, 2017

(54) CLUTCH DEVICE AND DIFFERENTIAL DEVICE WITH REDUCED FRICTION LOSS

(71) Applicant: GKN Driveline Japan Ltd, Tochigi (JP)

(72) Inventors: Yasuo Yamanaka, Oyama (JP); Atsushi Maruyama, Shimotsuke (JP)

(73) Assignee: GKN Driveline Japan Ltd., Tochigi (JP)

( * ) Notice: Subject to any disclaimer, the term of this patent is extended or adjusted under 35 U.S.C. 154(b) by 0 days.

(21) Appl. No.: 15/095,224

(22) Filed: Apr. 11, 2016

(65) Prior Publication Data

US 2016/0223064 A1 Aug. 4, 2016

Related U.S. Application Data

(63) Continuation of application No. PCT/JP2013/078204, filed on Oct. 17, 2013.

(51) Int. Cl.
| | |
|---|---|
| F16H 48/34 | (2012.01) |
| F16D 27/118 | (2006.01) |
| F16H 48/24 | (2006.01) |
| F16D 27/00 | (2006.01) |

(52) U.S. Cl.
CPC .......... F16H 48/34 (2013.01); F16D 27/118 (2013.01); F16H 48/24 (2013.01); F16D 2027/008 (2013.01)

(58) Field of Classification Search
None
See application file for complete search history.

(56) References Cited

U.S. PATENT DOCUMENTS

| | | | |
|---|---|---|---|
| 5,366,421 A | 11/1994 | Hirota | |
| 2004/0134736 A1* | 7/2004 | Ando | F16D 27/115 192/35 |

(Continued)

FOREIGN PATENT DOCUMENTS

| | | |
|---|---|---|
| DE | 4314887 A1 | 11/1993 |
| JP | 05-306739 A | 11/1993 |

(Continued)

OTHER PUBLICATIONS

International Search Report for PCT/JP2013/078204 (with English Translation; 5 pages).

(Continued)

*Primary Examiner* — Justin Holmes
(74) *Attorney, Agent, or Firm* — Bejin Bieneman PLC (57) ABSTRACT

A clutch device is comprised of: an end wall rotatable about an axis; an extended wall elongated as a unitary body from a first face of the end wall along the axis to define a circular slot; a clutch including a clutch member movable along the axis and capable of resting on a second face of the end wall; and a solenoid configured to drive the clutch member along the axis, the solenoid including a core conducting a magnetic flux, the core including a fitting portion slidably fitting in the circular slot, an abutment portion projecting radially outward from the fitting portion to abut along the axis on the extended wall, and a back portion projecting outward along the axis from the circular slot and retracting radially inward from the contact portion.

6 Claims, 10 Drawing Sheets

(56) References Cited

U.S. PATENT DOCUMENTS

| | | | |
|---|---|---|---|
| 2004/0231948 A1* | 11/2004 | Suzuki | F16D 27/115 192/84.7 |
| 2008/0009381 A1* | 1/2008 | Sudou | F16H 48/08 475/231 |
| 2008/0015076 A1* | 1/2008 | Fusegi | F16H 48/08 475/252 |
| 2011/0105264 A1 | 5/2011 | Maruyama et al. | |

FOREIGN PATENT DOCUMENTS

| | | |
|---|---|---|
| JP | 2008-232250 A | 10/2008 |
| JP | 2009-115281 A | 5/2009 |
| JP | 2010-078137 A | 4/2010 |
| JP | 2011-099460 A | 5/2011 |
| JP | 2012-172794 A | 9/2012 |

OTHER PUBLICATIONS

First Official Action from Japanese Intellectual Property Office for JP2015-542456 mailed on Feb. 21, 2017 (with English translation; 5 pages).

* cited by examiner

CLUTCH DEVICE AND DIFFERENTIAL DEVICE WITH REDUCED FRICTION LOSS

CROSS-REFERENCE TO RELATED APPLICATIONS

This application is a continuation Application of PCT International Application No. PCT/JP2013/078204 (filed Oct. 17, 2013), the entire contents of which are incorporated herein by reference.

BACKGROUND

The disclosure herein relates to a clutch device driven by a solenoid and a differential device including them, and in particular relates to a clutch device and a differential device therewith, which reduces energy loss caused by friction between a core of the solenoid and a casing.

When a vehicle turns to the right or the left, there is created a considerable difference in rotational speeds between the right and left wheels. In order to distribute torque from an engine/motor to right and left axles with allowing differential motion therebetween, in general, the vehicle is comprised of a differential device. The differential device is often comprised of a clutch and an actuator for driving the actuator from the exterior, for the purpose of limiting the differential motion between the axles or for any other purpose. A solenoid is often applied to the actuator.

As a solenoid is a stationary member connected to the exterior via electric cables, how to couple it with a rotating differential case presents difficulties. Japanese Patent Application Laid-open No. 2010-78137 discloses a related art.

SUMMARY

Magnetic flux created by a solenoid, when it passes from a core of the solenoid into a casing of a differential device, produces magnetic force that induces the core toward the casing. This magnetic force is not problematic in its radial directions relative to the axis of the casing, as the forces in counter directions provide mutual canceling, but this force in the axial direction acts to increase friction between the core and the casing. As friction therebetween is one of main sources of energy loss, directions where the magnetic flux permeates cannot be ignored as a factor in energy efficiency of the differential device. The device described below has been devised by applying means for controlling directions at which magnetic flux permeates on the basis of determining the source of the energy loss.

According to a first aspect, a clutch device is comprised of: an end wall rotatable about an axis; an extended wall elongated as a unitary body from a first face of the end wall along the axis to define a circular slot; a clutch including a clutch member movable along the axis and capable of resting on a second face of the end wall; and a solenoid configured to drive the clutch member along the axis, the solenoid including a core conducting a magnetic flux, the core including a fitting portion slidably fitting in the circular slot, an abutment portion projecting radially outward from the fitting portion to abut the extended wall along the axis, and a back portion projecting outwardly along the axis from the circular slot and retracting radially inwardly from the contact portion.

According to a second aspect, a differential device is comprised of: a casing so dimensioned as to house and drive a differential device, the casing including a first end wall, a second end wall and a side wall and being rotatable about an axis directed from the first end wall to the second end wall; an extended wall elongated as a unitary body from an external face of the first end wall along the axis to define a circular slot; a clutch housed in the casing and configured to limit differential motion of the differential device, the clutch including a clutch member movable along the axis and capable of resting on an internal face of the first end wall; and a solenoid configured to drive the clutch member along the axis, the solenoid including a core conducting a magnetic flux, the core including a fitting portion slidably fitting in the circular slot, an abutment portion projecting radially outward from the fitting portion to abut the extended wall along the axis, and a back portion projecting outward along the axis from the circular slot and retracting radially inward from the contact portion.

DESCRIPTION OF EMBODIMENTS

Exemplary embodiments will be described hereinafter with reference to FIGS. 1 through 10.

While these embodiments will be described by exemplifying a lock-up differential device of a bevel gear type, embodiments are not necessarily limited thereto. Further, while the following description illustrates an example in which the differential device is applied to axles, it may be applied to another shaft such as a propeller shaft.

Figure 1:
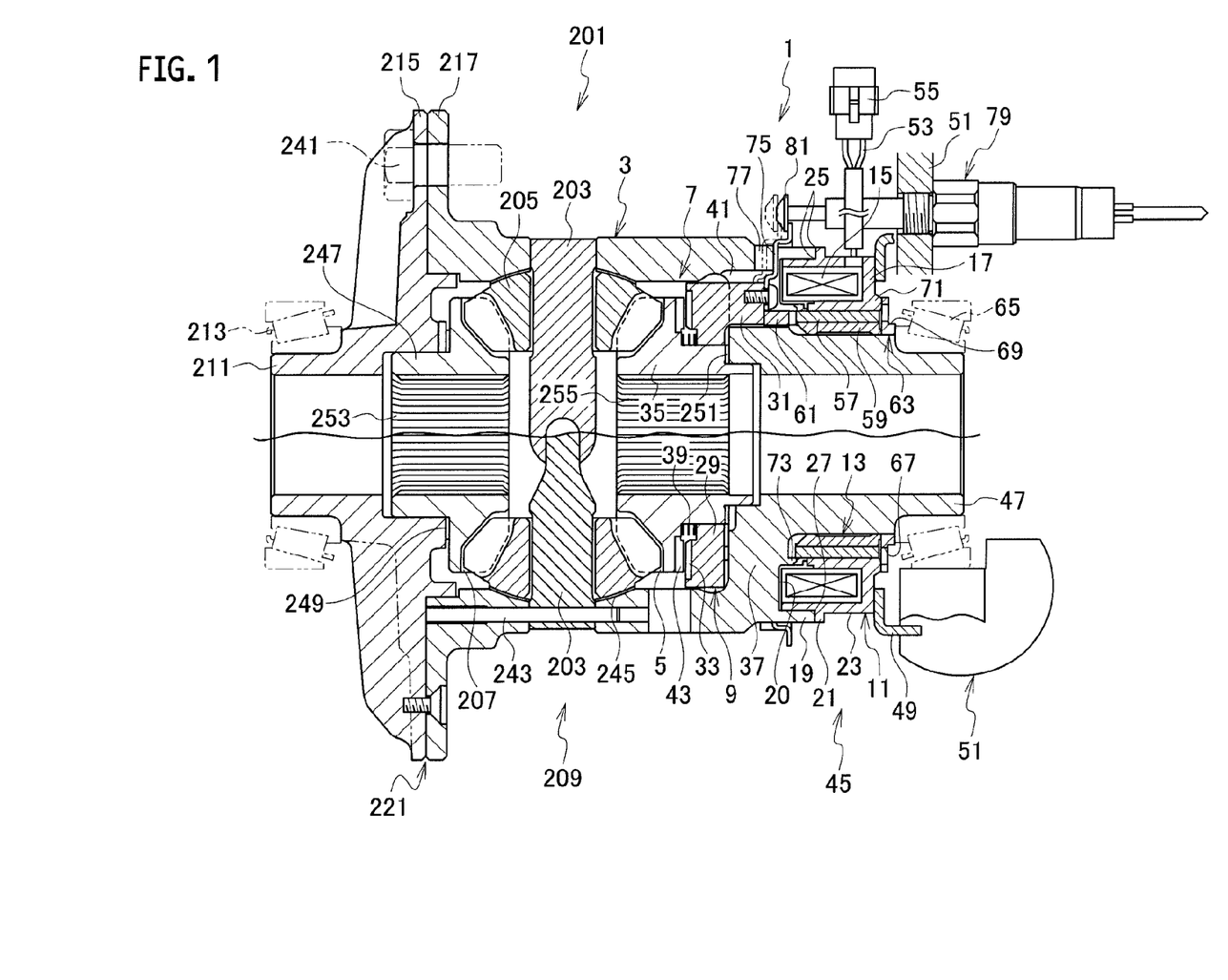
FIG. 1 is a cross sectional view of a differential device including a clutch according to an embodiment.

Referring to FIG. 1, a differential device 201 is comprised of a differential case 3 rotatable about an axis and a differential mechanism 209 of a bevel gear type housed therein. As the differential case 3 rotates, the differential mechanism 209 is driven thereby to differentially distribute torque to right and left axles. The differential device 201 is further comprised of a clutch device 1 for limiting differential motion.

The differential case 3 is a casing constituted of a case main body 217 and a cover body 215 covering one end thereof, and the differential mechanism 209 is housed in a cavity in its interior. The differential case 3 is rotatable about the axis, which runs from a wall portion (first end wall) 37 shown at the right in the drawing to the cover body (second end wall) 215. Respectively from the cover body 215 and the wall portion 37, boss portions 211, 47 project, and are supported respectively via bearings 213, 65 by a carrier 51. The carrier 51 is a stationary member which stands still relative to the vehicle body.

Figure 2:
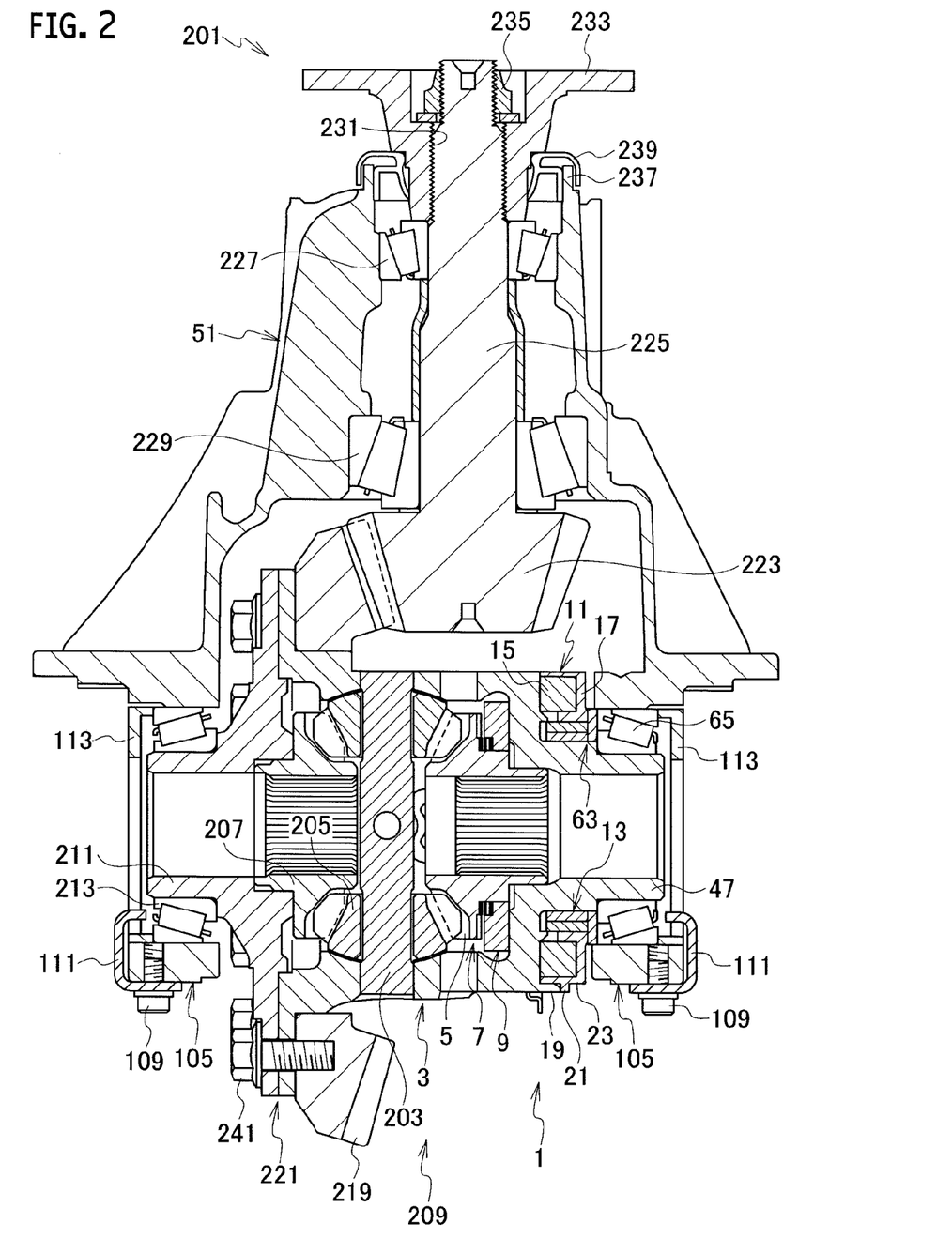
FIG. 2 is a cross sectional view of the differential device shown along with a carrier thereof.

Referring to FIG. 2, the differential case 3 is comprised of a flange portion 221 to which a ring gear 219 is fixed, and receives torque via a gear in mesh with the ring gear 219 from an engine or motor, thereby rotating about the axis. The gear in mesh with the ring gear 219 is, for example, a drive pinion 223 in connection with a transfer of the vehicle.

The drive pinion 223 may be smaller in diameter than the ring gear 219. The combination of the smaller drive pinion 223 and the larger ring gear 219 enables speed reduction. Further this combination, forming a bevel gear set, changes direction of torque transmission.

The drive pinion 223 may be formed as an end of an input shaft 225, or as a separate body therefrom. The torque of the engine/motor is input from the input shaft 225, changed in direction, and transmitted to the differential case 3.

The input shaft 225 is so arranged as to be perpendicular to the rotation axis and is rotatably supported via two bearings 227, 229 by the carrier 51. Another end of the input shaft 225 formed is a connection section 231 to which a connection member 233 for coupling with the propeller shaft is connected in a way as to be unitarily rotatable. A spline coupling or any other coupling may be used for this coupling. The propeller shaft is drivingly in connection with the engine/motor.

For securing the connection member 233 with the end of the input shaft 225, a nut 235 can be screwed thereon. Meanwhile pressure by tightening the nut 235 also acts on the bearings 227, 229 to put the input shaft 225 axially in place. Further, the carrier 51 is comprised of a seal member 237, which is close to the connection member 233, thereby partitioning the carrier 51 into the interior and the exterior. Around the outer periphery of the connection member 233 a dust cover 239 is arranged to be slidable on a lip section of the seal member 237. Thereby the interior of the carrier 51 is isolated from the exterior.

Driving force transmitted through the connection member 233 into the input shaft 225 is transmitted via the gear set constituted of the drive pinion 223 and the ring gear 219 to the differential case 3.

The differential case 3 is, at the flange portion 221, separable into the cover body 215 and the case main body 217. Through an opening of the case main body 217, which becomes accessible when the cover body 215 is detached, various members such as a pinion 205, a pair of side gears 207, 5 and a clutch member 9 of the clutch device 1 are taken into the interior. By means of proper bolts, the case main body 217 and the cover body 215 are fixed with each other so as to make the cover body 215 cover the opening of the case main body 217. The ring gear 219 is fixed to the flange portion 221 by means of bolts 241. Alternatively, the case main body 217, the cover body 215 and the ring gear 219 may be commonly fixed by means of the bolts 241.

Pinion shafts 203 are inserted through a side wall of the differential case 3 and respectively penetrate and support pinions 205. The pinion shafts 203 include for example one longer pinion shaft 203 and two shorter pinion shafts 203. An outer end portion of each pinion shaft 203 engages with the side wall of the differential case 3 and is prevented from being displaced and counter-rotated by a pin 243. The longer pinion shaft 203 has a hole in its middle and is prevented from being displaced and counter-rotated as inner end portions of the shorter pinion shafts 203 engage with this hole. Thereby any of the pinion shafts 203 rotates unitarily along with the differential case 3. The pinion shafts 203 support the pinions 205 in a way of being rotatable about these axes.

Four pinions 205 may be arranged at regular intervals in a circumferential direction of the differential case 3, whereas the pinions 205 are not limited thereto. The pinions 205 are respectively supported by any of one longer pinion shaft 203 and two pinion shafts 203 and, as the differential case 3 rotates, revolve around its axis. Further, between each pinion 205 and the differential case 3, a spherical washer 245 may be interposed.

The pinions 205, engaging with the pair of side gears 207, 5, transmit torque to them. When the side gears 207, tend to create difference in revolution speed, the respective pinions 205 can rotate about the pinion shafts 203 to allow differential motion between the side gears 207, 5.

The pair of side gears 207, 5 is respectively comprised of boss portions 247, 35, which respectively slidably fit in the case main body 217, thereby being supported by the differential case 3 in a way as to be rotatable relative to the differential case 3. In between the side gears 207, 5 and the differential case 3, thrust washers 249, 251 may be interposed.

The pair of side gears 207, 5 may be comprised of coupling sections 253, 255 of a circular-hollow shape on these internal peripheries, and these internal faces thereof may be splined in order to couple with the axles. The side gears 207, 5 are, due to the coupling sections 253, 255, made to rotate along with the right and left axles, and the torque input into the differential case 3 is thereby output to the axles.

Differential motion in the differential mechanism 209 of the differential device 201 is controllably locked or unlocked by the clutch device 1. The clutch device 1 is comprised of a clutch 7 so as to disable rotation of the side gear 5 relative to the differential case 3.

In the differential device 201 to which this clutch device 1 is applied, when the clutch 7 is connected, the differential case 3 is connected with the side gear 5, thereby differential motion of the differential mechanism 209 is set into a locked state. The pair of side gears 207, 5 in this state rotates in a synchronic speed. When the clutch device 1 is disengaged, differential motion in the pair of side gears 207, 5 is allowed to properly distribute torque.

The clutch device 1 is comprised of the clutch 7 for limiting relative motion between the differential case 3 and the side gear 5. The clutch 7 is comprised of a clutch member 9 capable of unitarily rotating with the differential case 3 and also movable in its axial direction, and an electromagnet (solenoid) 11. The electromagnet 11 is circular for example and arranged coaxially with the differential case 3. It may be comprised of a movable member 13, that is driven by excitation of the electromagnet 11 to manipulate the clutch member 9.

The electromagnet 11 is arranged axially adjacent to the wall portion (first end wall) 37 and is comprised of an electromagnetic coil 15 and a core 17 arranged around the electromagnetic coil 15.

Further, the differential case 3 is comprised of an extended wall 19 elongated from the wall portion 37. The extended wall 19 defines a circular slot 20, in which the core 17 partially fits to be supported.

The core 17 is comprised of a fitting portion fitting in the extended wall 19, and abutment portion 21 projecting radially outward therefrom. The abutment portion 21 abuts on an end face of the extended wall 19.

A portion in the core 17, which projects axially outwardly from the circular slot 20 defined by the extended wall 19, more specifically a back portion 23 relative to the abutment portion 21, may be much the same as the abutment portion 21 in diameter but instead may retract radially inwardly from the abutment portion 21. The back portion 23 may retract as a whole or in part. A face of the abutment portion 21, which is opposite to the face abuts the end face of the extended wall 19, more specifically a back face opposed to the back portion 23, has no member abutting it and is therefore opened.

The extended wall 19 may be comprised of bevel portions 25, 25, in which edges of the end face are respectively beveled. The bevel portion 25 may be formed only on the edge at the internal periphery.

Further, the abutment portion 21 may have a cutout 27 at its corner, where its corner is cut out in the axial direction to face the axial end face of the extended wall 19.

Figure 3:
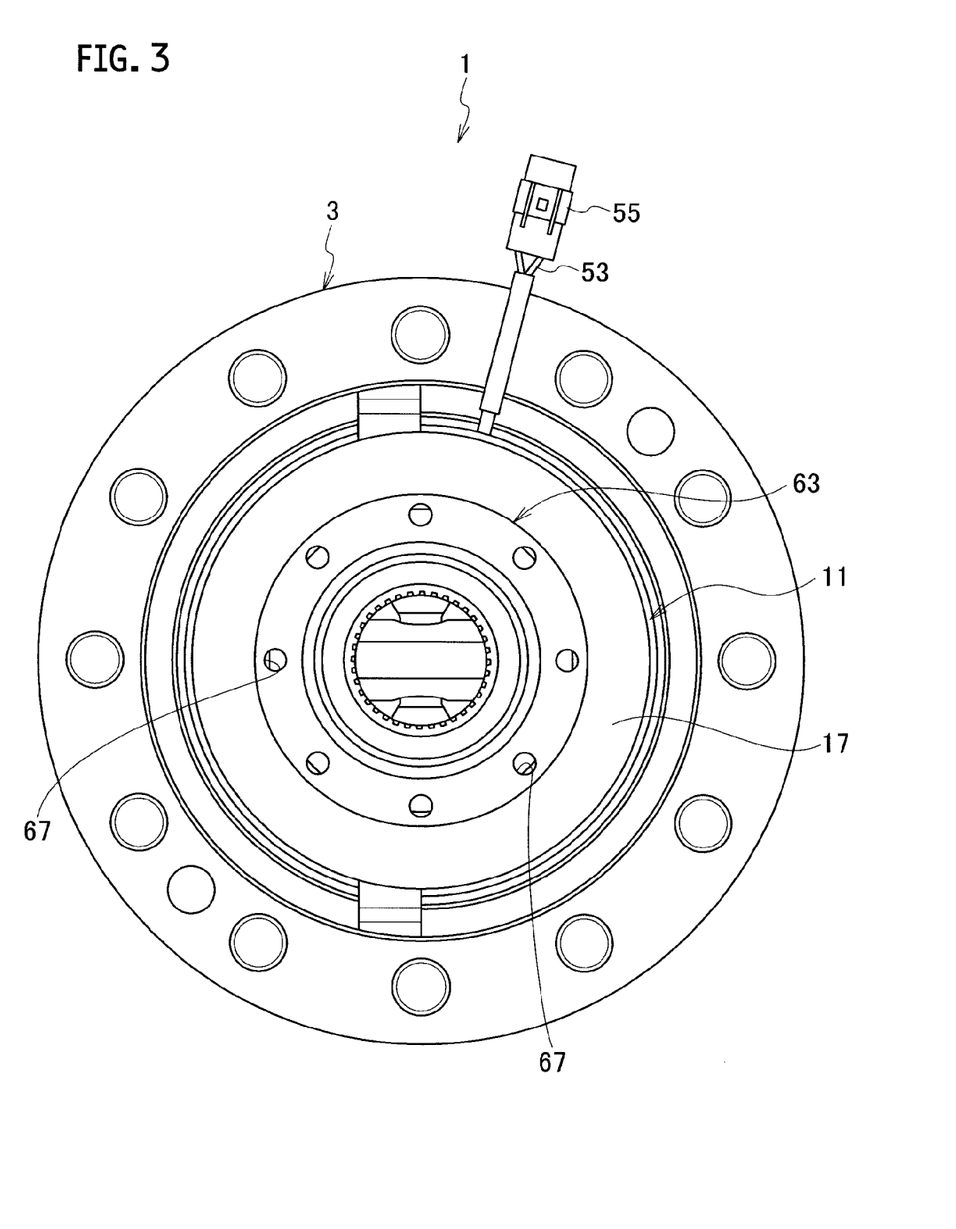
FIG. 3 is a side view of the differential device viewed from a side of a solenoid thereof.

As shown in FIGS. 1-3, the clutch member 9 is constituted of a base portion 29, a plurality of projection portions 31 unitarily axially elongated from one face of the base portion 29, and engaging teeth 33 formed on another face opposed thereto. The base portion 29 is circular and coaxially slidably fits on the boss portion 35 of the side gear 5. The clutch member 9 is capable of departing from the side gear 5 and resting on the internal face of the wall portion 37 of the differential case 3 (the clutch 7 gets disengaged), and is axially movable therefrom toward the side gear 5 (the clutch 7 gets engaged). Meanwhile to rest on the internal face of the wall portion 37 does not necessarily require contact.

In between the base portion 29 and the side gear 5, a biasing member 39 for biasing the clutch member 9 toward a direction to disengage the clutch 7 may be interposed.

The projection portions 31 leave considerable spaces between themselves in the circumferential direction of the base portion 29, which are regular intervals for example. The wall portion 37 of the differential case 3 has a plurality of holes 41 opened in the axial direction so as to respectively correspond to them, where the projection portions 31 respectively engage with the holes 41.

Engagement between the projection portions 31 and the holes 41 has the clutch member 9 counter-rotated from the differential case 3 and thereby the clutch member 9 and the differential case 3 unitarily rotate. Faces in the circumferential direction of the projection portions 31 and the holes 41 may be correspondingly slanted. The slanted faces function as cam faces for biasing the clutch member 9 in the axial direction.

Therefore, when the clutch member 9 moves in a direction where the clutch 7 is engaged, rotation of the differential case 3 sets the cam faces in contact with each other and converts its torque into thrust force in part, thereby strengthening the engagement of the clutch 7.

The clutch member 9 is comprised of the plurality of engaging teeth 33 on the face axially opposite to the projection portions 31. Corresponding to the engaging teeth 33, the back face of the side gear 5 is comprised of a plurality of engaging teeth 43. The clutch 7 is constituted of the combination of the engaging teeth 33, 43. The clutch 7, when the engaging teeth 33, 43 engage with each other, connects the clutch member 9 with the side gear 5 so as to rotate them unitarily.

In the differential device 201, by means of this connection between the clutch member 9 and the side gear 5, the differential case 3 is connected with the side gear 5 to get into unitary rotation, differential motion of the differential mechanism 209 is locked, and torque input into the differential case 3 is output via the pair of side gears 207, 5 to the axles.

Such engagement of the clutch 7 is established by axial movement of the clutch member 9 toward the clutch 7 and this movement is created by an actuator 45.

The actuator 45 is comprised of the electromagnet 11 and the movable member 13. The electromagnet 11 fits on the boss portion 47 of the differential case 3 and is then disposed axially adjacent to the wall portion 37 of the differential case 3. This electromagnet 11 is counter-rotated relative to the carrier 51 as a stationary member by means of an counter-rotation member 49 interposed therebetween. Any means such as welding is applicable for the purpose of fixation between the counter-rotation member and the electromagnet 11. The electromagnet 11 is comprised of the electromagnetic coil 15 and the core 17.

The electromagnet coil 15 is wound in a circular shape and mold-formed with a resin. The electromagnet coil 15 is connected to a lead line 53 led out to the exterior and is further connected to a controller (not shown in the drawings) via a connector 55 connected with a terminal of the lead line 53. The core 17 is disposed around the electromagnet coil 15.

The core 17 is formed of a magnetic material in order to conduct magnetic flux generated by the electromagnet coil 15. The core 17 covers the electromagnet coil 15 except a side opposed to the wall portion 37. As the wall portion 37 is formed of a magnetic material, when the core 17 makes contact with the wall portion 37, a magnetic circuit is formed, which substantially encloses the electromagnet coil 15 but leaves a gap facing a plunger 57 described later.

The core 17 at its fitting portion makes face contact with the extended wall 19 and the magnetic flux therefore permeates from the core 17 into the extended wall 19. The face contact with the extended wall 19 further supports the electromagnet 11 so as to hold the electromagnet 11 radially in place. This face contact is, however, not necessarily tight and can be loose to the extent that sliding motion is allowed without excessive frictional drag.

A face of the abutment portion 21 of the core 17, which faces the extended wall 19, abuts on an end face, facing in the axial direction, of the extended wall 19. The magnetic flux can permeate from the core 17 into the extended wall. This abutting contact with the end face of the extended wall supports the electromagnet 11 so as to prevent the electromagnet 11 from moving toward the case 3.

As described already, the extended wall 19 may be comprised of the beveled portions 25, 25 and also the abutment portion 21 may be comprised of the cutout portion 27. These structures can reduce sliding drag between the extended wall 19 and the abutment portion 21 and can consequently lead to reduction in friction in the device.

The movable member 13 is disposed at the inside of the electromagnet 11 and as well at the outside of the boss portion 47 so as to span the gap of the aforementioned magnetic circuit. The movable member 13 is comprised of a circular plunger 57 and a ring member 59.

The plunger 57 is formed of a magnetic material. The plunger 57 and the core 17 are close to each other but leave an air gap that is sufficiently narrow that magnetic flux can pass through it and the plunger 57 spans the gap in the magnetic circuit. The combination of the core 17, the wall portion 37 and the plunger 57 constitute a closed magnetic circuit. At the internal periphery of the plunger 57 secured is the ring member 59, thereby unitarily moving.

The ring member 59 is formed of a non-magnetic material to prevent magnetic flux from leaking off from internal periphery of the plunger 57 to the differential case 3. The ring member 59 is comprised of pressure sections 61 abutting on the clutch member 9. The pressure sections 61 are elongated to abut on the projection portions 31 of the clutch member 9 in the holes 41 of the wall portion 37.

With excitation of the electromagnet 11 and consequent movement of the movable member 13, the ring member 59 axially moves so that the pressure sections 61 press the clutch member 9 to engage the clutch 7.

A border member 63 is secured to the outer periphery of the boss portion 47 so as to prevent the core 17, the plunger 57 and the ring member 59 from falling off. Press-in for example can be used for its fixation but is not limiting. The border member 63 abuts on axially outer end faces of the core 17 and the ring member 59 to set these members axially in place. No member but the border member 63 is required for getting the core 17 axially in place and therefore it is not necessary to make a member fixed to the differential case 3 get in contact with the back face of the but portion 21, for example. The border member 63 is of a non-magnetic material and may be of a circular shape. Use of the non-magnetic material is advantageous in prevention of magnetic flux leakage and consequent improvement of magnetic efficiency.

Referring to FIG. 3, the border member 63 may be comprised of a plurality of opening portions 67. The opening portions 67 are formed at regular intervals in the circumferential direction of the border member 63 and communicate the side of the electromagnet 11 and the movable member 13 with the side of the bearing 65. As the opening portions 67 allow inflow of lubrication oil toward the movable member 13 and rotation of the bearing 65 in particular promotes flow of the lubrication oil, this structure improves the lubricating property of the movable member 13. This is thus advantageous in improving the property of response of the movable member 13.

As shown in FIG. 2, the border member 63 may be disposed to overlap with an inner race of the bearing 65 when viewed along the axial direction. Alternatively, the opening portions 67 of the border member 63 may be aligned with axial directions of respective rollers of the bearing 65. Such arrangement of the border member 63 effectively leads the flow of the lubrication oil created by the rotation of the bearing 65 toward the opening portions 67, thereby improving the lubricating property of the movable member 13.

The bearing 65 is of a tapered roller bearing for example and may be further comprised of a retainer. Referring to FIG. 1, the border member 63 has a dent at a dodge portion 69 so as not to interfere the retainer for the bearing 65. As the border member 63 has the dodge portion 69, the border member 63 can be disclosed axially closer to the bearing 65. This is advantageous in downsizing the device.

The core 17, at the side opposed to the border member 63, may be at the radially inner side (the side closer to the movable member 13), greater in thickness than that at the outer side. This difference in thickness increases the cross section of the magnetic flux path at the side closer to the movable member 13. This part is likely to cause saturation of magnetic flux. This increase in the cross section of the magnetic flux path therefore prevents saturation of magnetic flux. This is advantageous in improving thrust of the movable member 13 in the axial direction.

Figure 4:
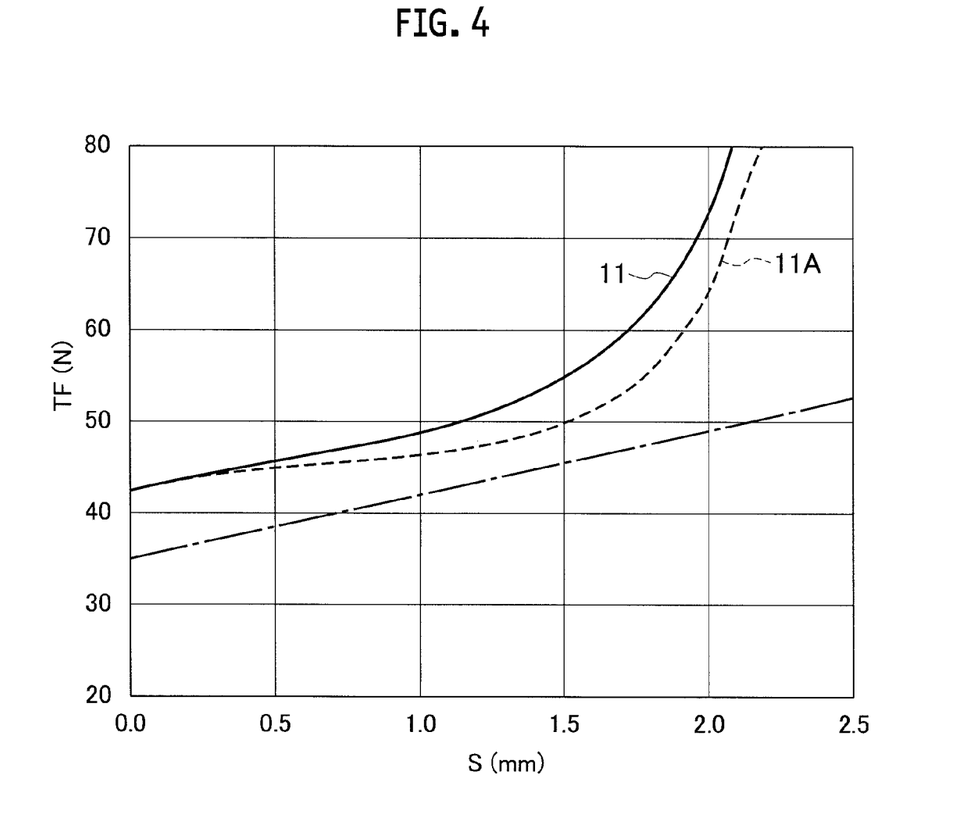
FIG. 4 is a graph illustrating change in thrust force TF relative to stroke S of a plunger, which compares the present embodiment with a comparative example.

FIG. 4 shows change in thrust TF of the movable member 13 relative to stroke S of the movable member 13 (plunger 57). An electromagnet 11 having a core 17 with a radially thicker inner side is here compared with an electromagnet 11A having a core uniform in thickness. As being apparent from FIG. 4, it is understood that the core 17 with a radially thicker inner side improves thrust of the movable member 13.

To thicken the radial inner side of the core 17, the core 17 may be comprised of a convex portion 71 as shown in FIG. 1. The border member 63 abuts on the end face of the convex portion 71 to set the electromagnet 11 axially in place. This is advantageous in stability of the axial position of the electromagnet 11.

A portion of the core 17 smaller in thickness can be used for fixation of the counter-rotation member 49. As it is not necessary to provide any special section for fixing the counter-rotation member 49, this is advantageous in downsizing the device.

Figure 5A:
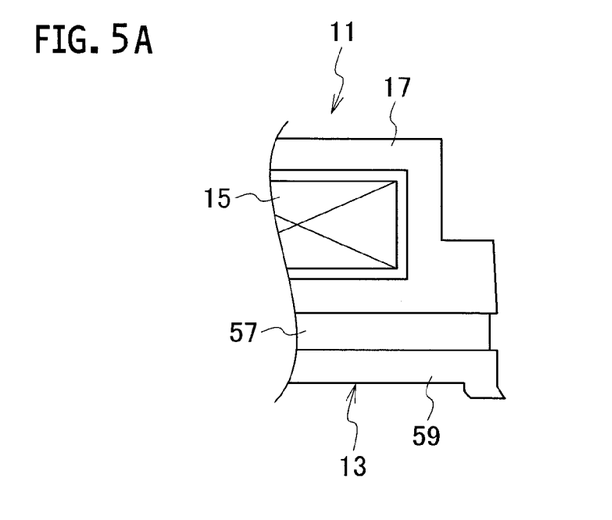
FIG. 5A is a cross sectional view showing an example of a shape of a back face of a core in the solenoid.
Figure 5B:
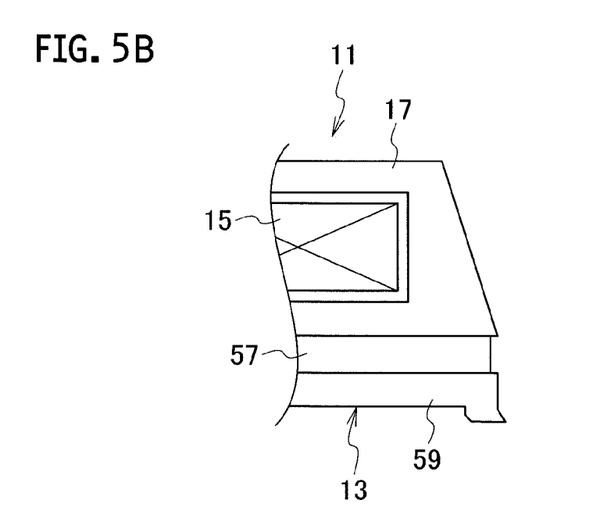
FIG. 5B is a cross sectional view showing another example of a shape of a back face of a core in the solenoid.

The core 17 of the electromagnet 11, at the side toward the boarder member 63, may be either of a shape having a step where its thickness steeply changes as shown in FIG. 5A for example or of a shape having a slope gradually changing its thickness as shown in FIG. 5B. Alternatively, any suitable shape that changes its thickness is also possible.

Referring again to FIG. 1, the wall portion 37 of the differential case 3 may be made thicker at a part adjacent to the electromagnet 11 than at a part adjacent to the movable member 13. As more inner parts bear greater torque, it is advantageous in strength and stiffness if the parts at issue are made greater in thickness. Further, as more outer parts become thinner, it is advantageous in reduction in weight.

The aforementioned thicker parts bear reaction force by engagement of the side gear 5. The fact that these parts are made thicker is advantageous in a point that the wall portion can stably receive the reaction force from the side gear 5.

The wall portion 37 may be elongated toward the core to form a magnetic flux path formation portion 73 constituting a part of the magnetic circuit. The magnetic flux path formation portion 73 may be elongated from a boundary between the thicker part and the thinner part of the wall portion 37. The gap in the magnetic circuit as described already may be a gap between the magnetic flux path formation portion 73 and the core 17. The magnetic flux path formation portion 73 contributes to making the electromagnet 11 closer to the wall portion 37 in the axial direction and is therefore advantageous in reduction in size of the device.

In the clutch device 1 thus constituted, when the electromagnet 11 is excited, its magnetic flux forms a closed loop permeating the core 17, the plunger 57, and the wall portion 37 of the differential case 3 and then the magnetic flux drives the plunger 57 as it passes therethrough, thereby moving the ring member 59 in the axial direction. The ring member 59, via the pressure sections 61, presses the clutch member 9, thereby engaging the clutch 7. As the magnetic flux is unlikely to leak from the closed loop to the exterior, the magnetic energy is effectively used.

As the clutch 7 engages, in the differential device 201, the side gear 5 and the clutch member 9 get connected together to unitarily rotate, thereby connecting the side gear 5 with the differential case 3 to lock differential motion of the differential mechanism 209.

When electricity to the electromagnet 11 is turned off, the clutch member 9 is forced by the biasing member 39 to depart away from the side gear 5, thereby disengaging the clutch 7.

When the clutch 7 disengages, in the differential device 201, the side gear 5 becomes rotatable relative to the clutch member 9, so that the side gear 5 becomes rotatable relative to the differential case 3, thereby enabling differential motion of the differential mechanism 209.

The differential device 201 may be comprised of a means for detecting the axial position of the clutch member 9. By detecting the axial position of the clutch member 9, the state of the clutch 7 as to whether it engages or disengages can be detected, thereby enabling decision as to whether the differential device 201 is locked up or can make differential motion.

As an example of the means for detecting the position, the differential device 201 may be comprised of a detector member 75. The detector member 75 is of a disk shape for example and has a plurality of projecting plate sections projecting from its internal periphery toward the clutch member 9. The differential case 3 is comprised of holes 77 radially penetrating it in positions corresponding with the projecting plate sections. The plurality of projecting plate sections faces the interior of the differential case 3 through the holes 77 and is fixed with projections 31 of the clutch member 9 by means of bolts or such.

The detector member 75 therefore moves unitarily with the clutch member in the axial direction. A position switch 79 is so disposed as to latch on a radially outer end of the detector member 75.

The position switch 79 is fixed to the carrier 51 and is connected to the controller. The position switch 79 is further comprised of a contact section 81 so as to switch it on and off. The outer end of the detector member 75 engages with the contact section 81.

The position switch 79 is switched ON-OFF as the contact section 81 moves forward and backward. Therefore the position switch 79 detects the axial position of the clutch member 9, thereby detecting engagement-disengagement of the clutch 7. More specifically, the position switch 79 can detect whether the differential mechanism 209 of the differential device 201 is locked or unlocked.

In the clutch device 1 thus constituted, as the extended wall 19 of the differential case 3 abuts the abutment portion 21 of the core 17 of the electromagnet 11, the differential case 3 and the electromagnet 11 support each other so as to set them immovable in the axial direction.

As described already, the core 17 is comprised of the back portion 23 at the back in regard to the abutment portion 21 and the back portion 23 may retract radially inwardly from the abutment portion 21. The back portion 23 may retract as a whole or may partly retract. Further it is advantageous if the fitting portion of the core 17 is made thicker.

Figure 6A:
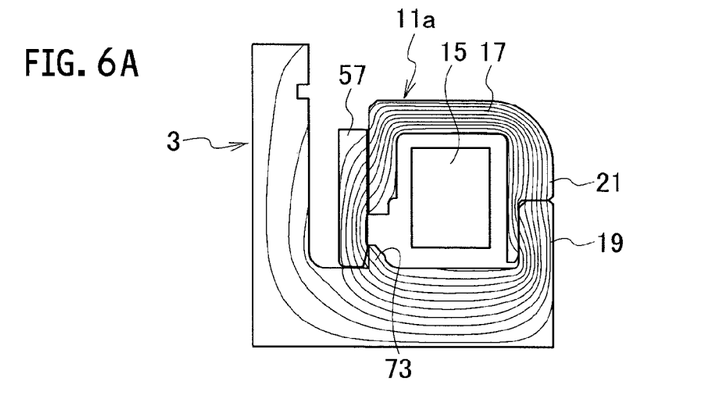
FIG. 6A is a cross sectional view of a part of the solenoid and the casing, which illustrates a map of a magnetic flux in the core according to an example.

Referring to FIG. 6A, in the electromagnet 11*a* in which the back portion 23 does not retract from the bu abutment t portion 21, considerable part of the magnetic flux permeates from the abutment portion 21 into the end face of the extended wall 19. This magnetic flux creates attractive force that attracts the core 17 toward the extended wall 19 and therefore increases friction between the differential case 3 and the electromagnet 11*a*. This causes an increase in energy loss accompanying rotation.

Figure 6B:
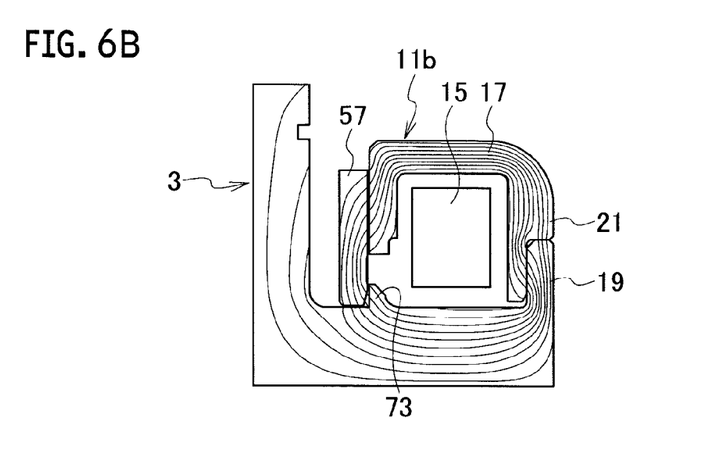
FIG. 6B is a cross sectional view of a part of the solenoid and the casing, which illustrates a map of a magnetic flux in the core according to another example.

Referring to FIG. 6B, in the electromagnet 11*b* in which the fitting portion, which fits in the internal periphery of the extended wall 19, of the core 17 is made thicker, as compared with the electromagnet 11*a*, a greater part of the magnetic flux permeates in the radial directions from the fitting portion into the internal periphery of the extended wall 19 and in turn a smaller part permeates in the axial direction. As friction between the differential case 3 and the electromagnet 11*a* is decreased, this construction is advantageous in suppressing energy loss.

Figure 6C:
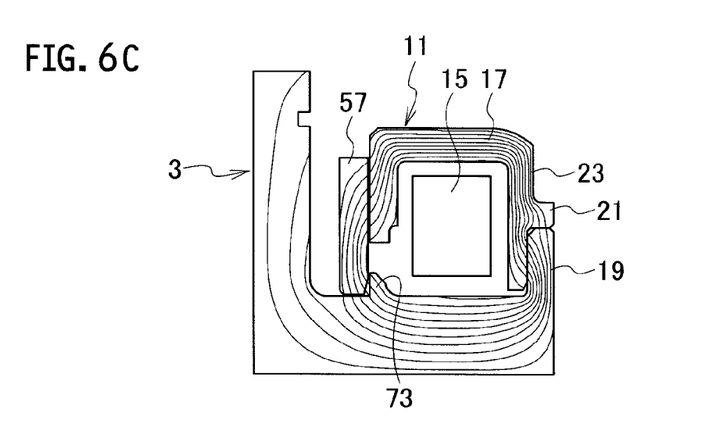
FIG. 6C is a cross sectional view of a part of the solenoid and the casing, which illustrates a map of a magnetic flux in the core according to still another example.

Referring to FIG. 6C, in the electromagnet 11 in which the back portion 23 retracts from the abutment portion 21, the magnetic flux is unlikely to take a detour from the back portion 23 to the abutment portion 21. Major part of the magnetic flux is therefore conducted in the axial direction into the fitting portion and then permeates radially into the internal periphery of the extended wall 19. As only small part of the magnetic flux axially permeates into the extended wall 19, friction between the differential case 3 and the electromagnet 11 is hardly increased. More specifically, this construction is advantageous in suppressing energy loss.

Figure 7:
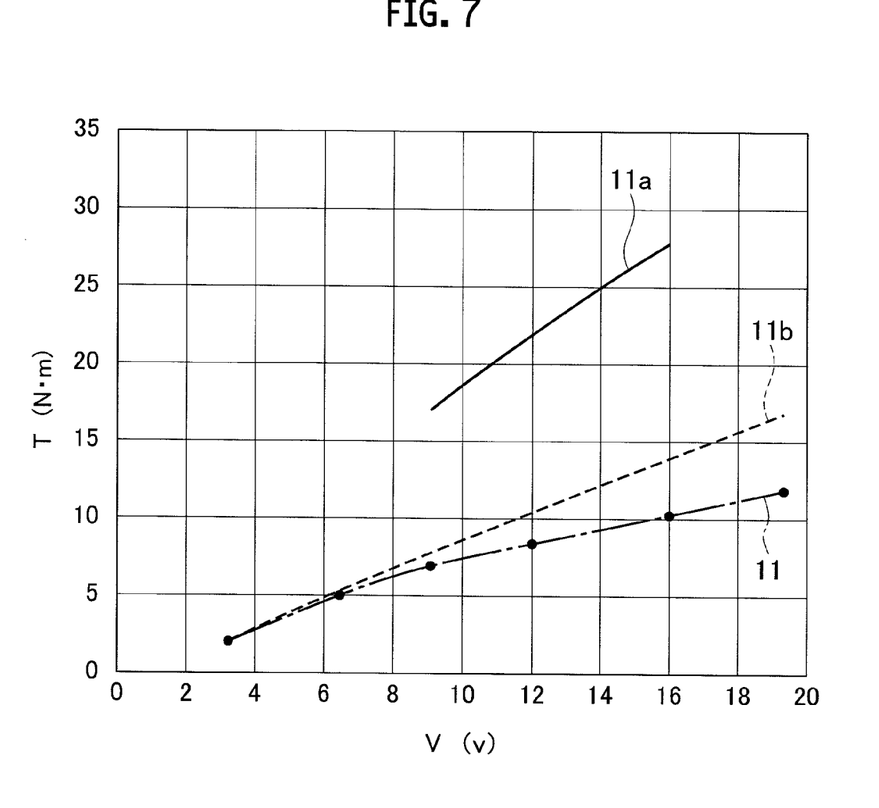
FIG. 7 is a graph illustrating change in drag torque T relative to applied voltage V, which compares the examples shown in FIGS. 6A through 6C.

Referring to FIG. 7, change in drag torque T relative to applied voltage V will be compared among the electromagnet 11*a*, the electromagnet 11*b*, and the electromagnet 11 hereinafter. As being apparent from FIG. 7, if equivalent voltage is applied thereto, drag torque in the electromagnet 11*b* is smaller than in the electromagnet 11*a* (smaller friction), and in the electromagnet 11 it is still smaller (smaller friction). This drawing makes apparent the effect of decreasing friction originated from increasing the thickness of the fitting portion and retracting the back portion from the but portion.

Figure 8:
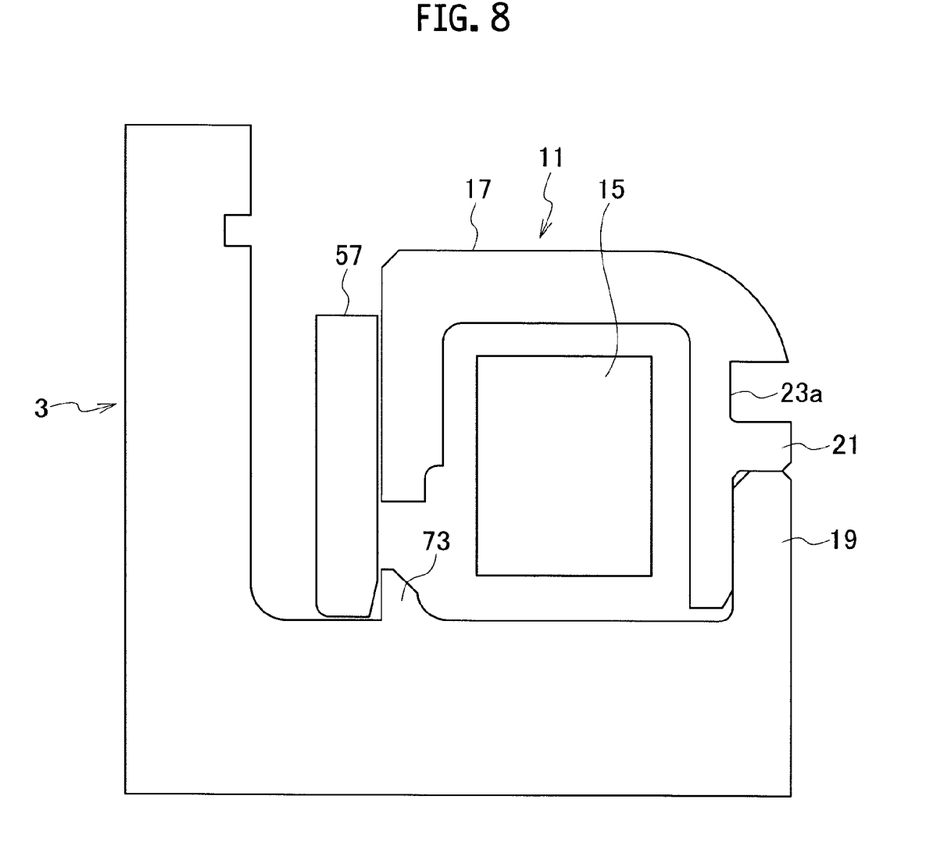
FIG. 8 is a cross sectional view showing another example of the shape of the core in the solenoid.

As described already, the whole of the back portion 23 is not necessarily retracted and it may be in a form like the back portion 23*a* shown in FIG. 8, where only the back face opposite to the but portion 21, in a form of a slot running in the circumferential direction, retracts. Alternatively, this part is not necessarily continuous in the circumferential direction but plural parts at intervals in the circumferential direction may retract.

Figure 9:
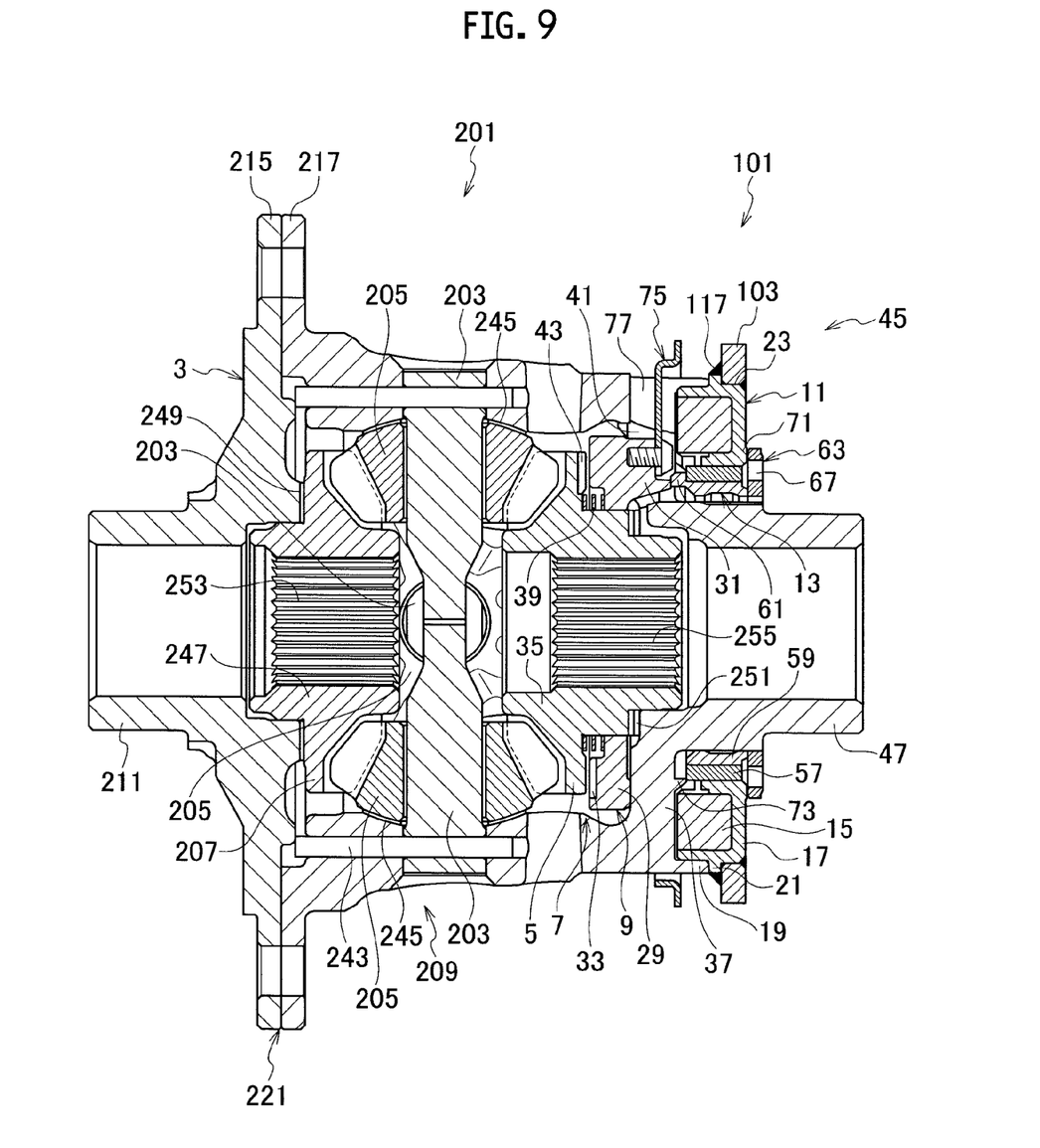
FIG. 9 is a cross sectional view of a differential device including a clutch according to another embodiment.
Figure 10:
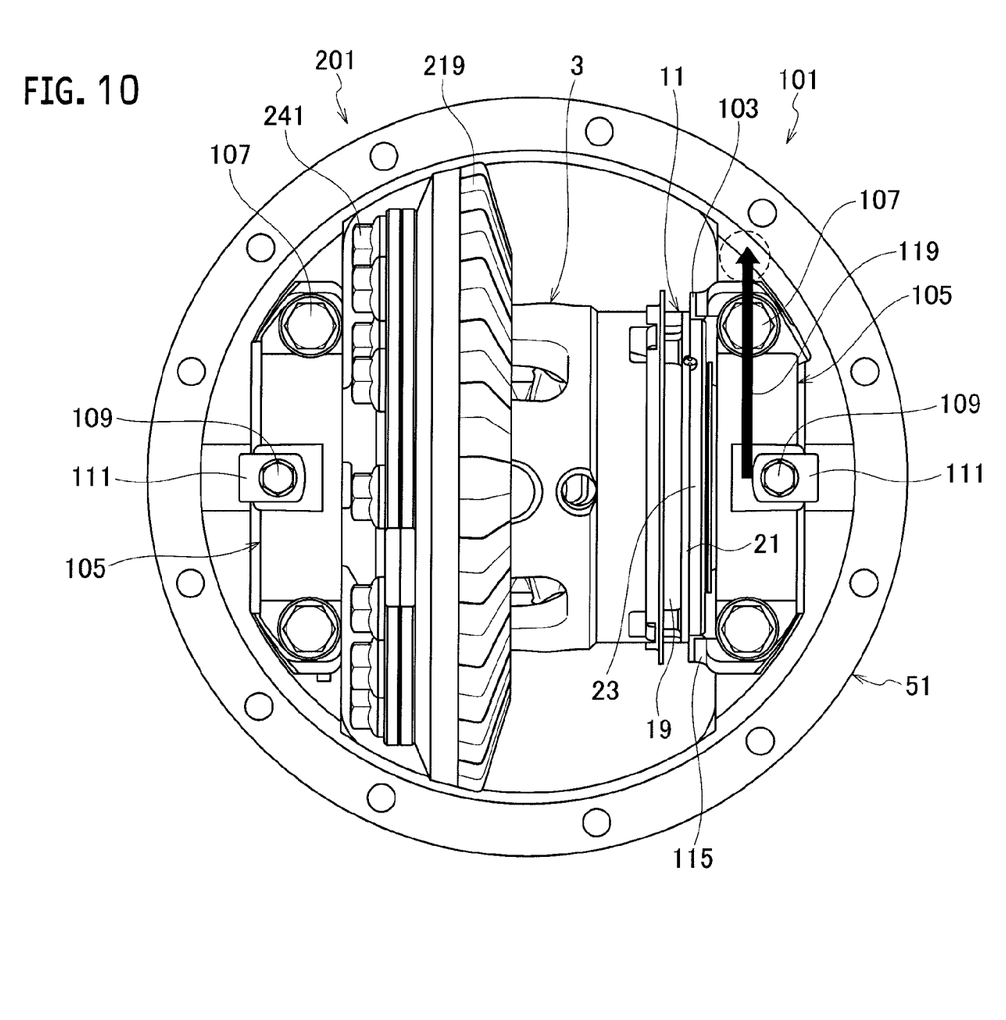
FIG. 10 is a plan view of the differential device viewed through an opening on the carrier.

Referring to FIG. 9 and FIG. 10, there may be some variations in the form of support of the differential device and the clutch device.

In accordance with the example shown in FIG. 9, the counter-rotation member 103 is coupled with the back portion 23 of the core 17.

Referring to FIG. 10, the carrier 51 is comprised of a bearing cap 105 for supporting the bearing 65 rotatably supporting the differential case 3.

The bearing cap 105 is of a semi-circular ring shape and is fixed to the carrier 51 by means of a plurality of bolts 107. The carrier 51 has a semi-circular structure and therefore, when the bearing cap 105 is installed in the carrier 51, forms a complete circle, which surrounds and retains the bearing 65.

Referring to FIG. 2, a support member 113 for supporting the bearing 65 in the axial direction may be fixed to the bearing 105. For fixation, a proper retainer member 111 and a bolt 109 for securing it with the bearing cap 105 can be used, for example.

Referring to FIG. 10, the bearing cap 105 may be, for the purpose of engagement with the counter-rotation member 103, comprised of two or more engaging portions 115. In the example shown in the drawing, each engaging portion 115 is a projection elongated from the bearing 105 in the axial direction of the differential case 3 and as well two engaging portions 115 are disposed symmetrically. The counter-rotation member 103 engages with the engaging portion 115 to have the electromagnet 11 counter-rotated.

The counter-rotation member 103 is, at two or more coupling portions 117, coupled with the core 17 of the electromagnet 11 by means of welding, for example. The coupling portions 117 are provided at intervals on the back portion 23 of the core 17, as being corresponding to the arrangement of the engaging portions 115.

The counter-rotation member 103 is, at two or more sites in the circumferential direction of the electromagnet 11, adjacent in the direction of rotation of the electromagnet 11 to the engaging portions 115 of the bearing cap 105, thereby being mutually engaging. As is apparent from FIG. 10, at least one of these two or more engagements prevents rotation of the electromagnet 11 in a direction indicated by an arrow 119, and another prevents rotation in its counter direction. More specifically, two or more sets of engagements between the counter-rotation member 103 and the engaging portions 115 prevent the electromagnet 11 from rotating in either direction. Meanwhile, the counter-rotation member 103 may be formed in a unitary body with the core 17 at the back portion 23 of the core 17 of the electromagnet 111. A structure where only one engagement prevents rotation in either direction is possible.

More specifically, according to the support structure illustrated in FIGS. 9, 10, it is required only to attach the bearing cap 105 to the carrier 15 for enabling counter-rotation of the electromagnet 11 and therefore any additional structure is not necessary for counter-rotation. This structure is advantageous in structural simplicity and facility in production thereof. Any counter-rotation portion axially projecting toward a carrier as illustrated in FIG. 1 is not necessary, and therefore the counter-rotation member 103 and the engaging portions 115 do not have any projections in radial directions. Thus, this structure is advantageous in reduction in size of the carrier 51.

Meanwhile, although the engaging portions 115 engaging with the counter-rotation member 103 are formed on the bearing cap 105, the embodiments are not limited thereto and any projections from the carrier 51 toward the electromagnet 11 in the axial direction can be used as engaging portions.

The above descriptions are made with reference to a dog clutch as an example, in which teeth are opposed to each other in the axial direction, but the foregoing descriptions are applicable to any types, such as a type in which sleeves move in the axial direction to form a dog clutch, or any type of friction clutches such as a multi-plate clutch or a single-plate clutch.

Although certain embodiments have been described above, modifications and variations of the embodiments described above will occur to those skilled in the art, in light of the above teachings.

The invention claimed is:

1. A clutch device, comprising:
   an end wall rotatable about an axis;
   an extended wall elongated as a unitary body from a first face of the end wall along the axis to define a circular slot;
   a clutch including a clutch member movable along the axis and capable of resting on a second face of the end wall; and
   a solenoid configured to drive the clutch member along the axis, the solenoid including a core conducting a magnetic flux, the core including a fitting portion slidably fitting in the circular slot, an abutment portion projecting radially outwardly from the fitting portion to abut the extended wall along the axis, and a back portion projecting outwardly along the axis from the circular slot and retracting radially inwardly from a contact portion, the back portion not supporting a bearing.

2. The clutch device of claim 1, wherein a back face of the abutment portion opposite to a face abutting the extended wall relative to the axis does not abut any member fixed to the end wall.

3. The clutch device of claim 1, further comprising:
   a plunger driven by the magnetic flux to drive the clutch,
   wherein the core, the end wall, and the plunger are so arranged as to form a closed magnetic circuit conducting the magnetic flux.

4. A differential device comprising:
   a casing dimensioned to house and drive a differential device, the casing including a first end wall, a second end wall, and a side wall, and being rotatable about an axis directed from the first end wall to the second end wall;
   an extended wall elongated as a unitary body from an external face of the first end wall along the axis to define a circular slot;
   a clutch housed in the casing and configured to limit differential motion of the differential device, the clutch including a clutch member movable along the axis and capable of resting on an internal face of the first end wall; and
   a solenoid configured to drive the clutch member along the axis, the solenoid including a core conducting a magnetic flux, the core including a fitting portion slidably fitting in the circular slot, an abutment portion projecting radially outwardly from the fitting portion to abut the extended wall along the axis, and a back portion projecting outwardly along the axis from the circular slot and retracting radially inwardly from a contact portion, the back portion not supporting a bearing.

5. The differential device of claim 4, wherein a back face of the abutment portion opposite to a face abutting the extended wall relative to the axis does not abut on any member fixed to the end wall.

6. The differential device of claim 4, further comprising:
   a plunger driven by the magnetic flux to drive the clutch,
   wherein the core, the first end wall, and the plunger are so arranged as to form a closed magnetic circuit conducting the magnetic flux.

* * * * *